US012695122B2

(12) United States Patent

Yeom et al.

(10) Patent No.: US 12,695,122 B2
(45) Date of Patent: Jul. 28, 2026

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Chul Eun Yeom, Daejeon (KR); Young Min Lim, Daejeon (KR); Jung Min Lee, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 925 days.

(21) Appl. No.: 17/789,856

(22) PCT Filed: Jul. 15, 2021

(86) PCT No.: PCT/KR2021/009091
§ 371 (c)(1),
(2) Date: Jun. 29, 2022

(87) PCT Pub. No.: WO2022/015072
PCT Pub. Date: Jan. 20, 2022

(65) Prior Publication Data

US 2022/0393244 A1 Dec. 8, 2022

(30) Foreign Application Priority Data

Jul. 16, 2020 (KR) ........................ 10-2020-0088217
Jul. 14, 2021 (KR) ........................ 10-2021-0092353

(51) Int. Cl.
*H01M 10/0569* (2010.01)
*H01M 4/02* (2006.01)
(Continued)

(52) U.S. Cl.
CPC ....... *H01M 10/0569* (2013.01); *H01M 4/505* (2013.01); *H01M 4/525* (2013.01);
(Continued)

(58) Field of Classification Search
CPC ......... H01M 4/505–525; H01M 50/46; H01M 2300/0037; H01M 10/0569; H01M 10/0525; H01M 10/0567; H01M 10/0568
See application file for complete search history.

(56) References Cited

U.S. PATENT DOCUMENTS

2006/0035144 A1 2/2006 Shimizu et al.
2010/0035146 A1 2/2010 Fujii et al.
(Continued)

FOREIGN PATENT DOCUMENTS

CN 109314271 A 2/2019
CN 109314278 A 2/2019
(Continued)

OTHER PUBLICATIONS

Search report from International Application No. PCT/KR2021/009091, mailed Nov. 1, 2021.
(Continued)

*Primary Examiner* — Haroon S. Sheikh
*Assistant Examiner* — Kan Luo
(74) *Attorney, Agent, or Firm* — Lerner David LLP

(57) ABSTRACT

A non-aqueous electrolyte solution for a lithium secondary battery and a lithium secondary battery including the same are disclosed herein. In some embodiments, a non-aqueous electrolyte solution comprises a lithium salt, an organic solvent containing a carbonate compound and a propionate compound, and an additive containing 1,4-dicyano-2-butene and 1,3,5-cyclohexanetricarbonitrile, wherein a volume ratio of the carbonate compound to the propionate compound is 10:90 to 40:60, and wherein a weight ratio of the 1,4-dicyano-2-butene to the 1,3,5-cyclohexanetricarbonitrile is 1:1.5 to 1:3.7.

7 Claims, 1 Drawing Sheet

(51) Int. Cl.

| | |
|---|---|
| ***H01M 4/505*** | (2010.01) |
| ***H01M 4/525*** | (2010.01) |
| ***H01M 10/0525*** | (2010.01) |
| ***H01M 10/0567*** | (2010.01) |
| ***H01M 10/0568*** | (2010.01) |
| ***H01M 50/46*** | (2021.01) |

(52) U.S. Cl.

CPC ... *H01M 10/0525* (2013.01); *H01M 10/0567* (2013.01); *H01M 10/0568* (2013.01); *H01M 50/46* (2021.01); *H01M 2004/028* (2013.01); *H01M 2300/0037* (2013.01)

(56) References Cited

U.S. PATENT DOCUMENTS

| | | | |
|---|---|---|---|
| 2011/0111305 A1 | 5/2011 | Jeon et al. | |
| 2012/0196191 A1 | 8/2012 | Jeon et al. | |
| 2015/0364794 A1 | 12/2015 | Nakazawa et al. | |
| 2019/0109346 A1 | 4/2019 | Odani et al. | |
| 2019/0148776 A1 | 5/2019 | Cho et al. | |
| 2019/0334208 A1 | 10/2019 | Nakazawa et al. | |
| 2020/0099098 A1 | 3/2020 | Wang et al. | |
| 2021/0043974 A1* | 2/2021 | Kinoshita | H01G 11/64 |
| 2021/0408547 A1 | 12/2021 | Wang | |
| 2022/0336858 A1 | 10/2022 | Nakazawa et al. | |
| 2022/0399572 A1 | 12/2022 | Lee et al. | |
| 2024/0128511 A1 | 4/2024 | Nakazawa et al. | |

FOREIGN PATENT DOCUMENTS

| | | | | |
|---|---|---|---|---|
| CN | 110010882 A | 7/2019 | | |
| CN | 110165219 A | 8/2019 | | |
| EP | 3373380 A1 | 9/2018 | | |
| EP | 4040559 A1 | 8/2022 | | |
| JP | 2006073513 A | 3/2006 | | |
| JP | 2010073367 A | 4/2010 | | |
| JP | 2017228426 A | 12/2017 | | |
| KR | 20090018003 A | 2/2009 | | |
| KR | 20090095577 A | 9/2009 | | |
| KR | 20120059441 A | 6/2012 | | |
| KR | 20170139341 A | 12/2017 | | |
| KR | 20190054920 A | 5/2019 | | |
| KR | 20190139446 A | 12/2019 | | |
| WO | 2012074300 A2 | 6/2012 | | |
| WO | WO-2019188210 A1 * | 10/2019 | | H01G 11/64 |

OTHER PUBLICATIONS

Extended European Search Report for Application No. 21841303. 7 dated Jul. 31, 2023. 7 pgs.

* cited by examiner

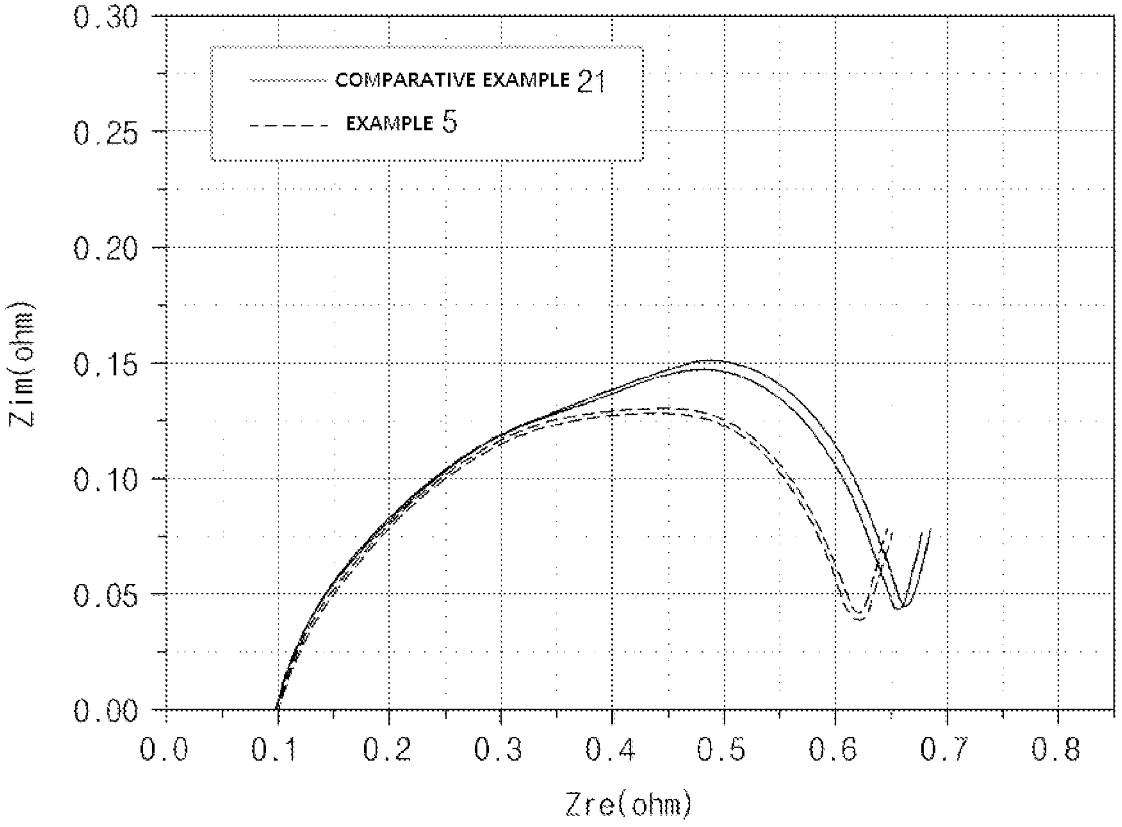
COMPARATIVE EXAMPLE 21
EXAMPLE 5
0.30
0.25
0.20
0.15
0.10
0.05
0.00
Zim(ohm)
0.0
0.1
0.2
0.3
0.4
0.5
0.6
0.7
0.8
Zre(ohm)

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2021/009091, filed on Jul. 15, 2021, which claims priority from Korean Patent Application Nos. 10-2020-0088217, filed on Jul. 16, 2020, and 10-2021-0092353, filed on Jul. 14, 2021, the disclosures of which are incorporated by reference herein.

TECHNICAL FIELD

The present invention relates to a non-aqueous electrolyte solution for a lithium secondary battery, which may form a stable film on a surface of an electrode, and a lithium secondary battery including the same.

BACKGROUND ART

There is a need to develop technology for efficiently storing and utilizing electrical energy as personal IT devices and computer networks are developed with the recent development of information society and the accompanying dependency of society as a whole on the electrical energy is increased.

A lithium secondary battery is a technology that is most suitable for various applications, wherein it has been used in electric vehicles and power storage devices as well as power sources of notebook computers and mobile phones in view of the fact that it may be miniaturized to be applicable to a personal IT device in comparison to a lead battery or nickel-cadmium battery, has high energy density and operating voltage, and may have high capacity.

In order to achieve high energy density in a lithium secondary battery, a high operating voltage is required.

However, when the secondary battery is operated in a high voltage environment, an electrolyte solution is depleted due to a continuous oxidative decomposition reaction of the electrolyte solution, or a film formed on a surface of an electrode is degraded (collapsed) due to a side reaction between the electrolyte solution and the electrode, and, as a result, a problem occurs in which transition metal ions are dissolved into the non-aqueous electrolyte solution or gas is generated. Since this problem may be accelerated by an increase in voltage and storage temperature or heat generation during the operation of the battery, cycle characteristics of the battery may be degraded.

In order to improve this problem, there is a need to develop a non-aqueous electrolyte solution which may prevent the continuous decomposition of the electrolyte solution and may suppress reduction of the dissolved transition metal on a negative electrode by forming a stable film on the surface of the electrode at high voltage.

DISCLOSURE OF THE INVENTION

Technical Problem

An aspect of the present invention provides a non-aqueous electrolyte solution for a lithium secondary battery which may form a stable film on a surface of a positive electrode.

Another aspect of the present invention provides a lithium secondary battery in which high-temperature storage characteristics and cycle characteristics during a high voltage operation are improved by including the non-aqueous electrolyte solution for a lithium secondary battery.

Technical Solution

According to an aspect of the present invention, there is provided a non-aqueous electrolyte solution for a lithium secondary battery which includes:

a lithium salt, an organic solvent containing a carbonate compound and a propionate compound, and an additive containing 1,4-dicyano-2-butene and 1,3,5-cyclohexanetricarbonitrile (i.e. (1α,3α,5α)-1,3,5-cyclohexanetricarbonitrile), wherein a volume ratio of the carbonate compound to the propionate compound is 10:90 to 40:60, and wherein a weight ratio of the 1,4-dicyano-2-butene to the 1,3,5-cyclohexanetricarbonitrile is 1:1.5 to 1:3.7.

According to another aspect of the present invention, there is provided a lithium secondary battery including a positive electrode including a positive electrode active material; a negative electrode including a negative electrode active material; a separator disposed between the negative electrode and the positive electrode; and the non-aqueous electrolyte solution for a lithium secondary battery according to the present invention.

Advantageous Effects

Since a non-aqueous electrolyte solution of the present invention includes 1,3,5-cyclohexanetricarbonitrile and 1,4-dicyano-2-butene containing two or more nitrile groups (—CN) in its structure, it may form a stable film, which may facilitate movement of lithium ions even during a high voltage operation, on a surface of a positive electrode. As a result, it may effectively suppress transition metal dissolution by preventing collapse of the positive electrode due to HF, and may improve a decomposition reaction of the non-aqueous electrolyte solution by preventing a side reaction between the positive electrode and the electrolyte solution.

The non-aqueous electrolyte solution of the present invention may suppress gas generation at high voltage by decreasing an amount of a carbonate compound, which is easily decomposed at high voltage, among organic solvent components.

If the non-aqueous electrolyte solution of the present invention is used, a lithium secondary battery having improved high-temperature storage performance and cycle capacity retention during a high voltage operation may be achieved.

BRIEF DESCRIPTION OF THE DRAWINGS

The following drawing attached to the specification illustrate preferred examples of the present invention by example, and serve to enable technical concepts of the present invention to be further understood together with detailed description of the invention given below, and therefore the present invention should not be interpreted only with matters in such drawings.

The FIGURE is a graph illustrating a resistance evaluation result according to Experimental Example 9 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

With respect to a lithium secondary battery, a film having passivation ability is formed on surfaces of a negative electrode and a positive electrode, while a non-aqueous electrolyte solution is decomposed during initial charge and discharge, to improve high-temperature storage characteristics. However, since metallic elements are lost due to dissolution of transition metal elements from the positive electrode while the film degrades during high voltage operation and high-temperature storage, discharge capacity may decrease. Also, since the transition metal ions thus dissolved are not only electrodeposited on the negative electrode reacting in a strong reduction potential range to consume electrons, but also destruct a solid electrolyte interphase (SEI) on the surface of the negative electrode to expose the surface of the negative electrode, an additional electrolyte decomposition reaction is caused. As a result, capacity of a cell may be continuously reduced while irreversible capacity is increased.

Thus, the present invention aims at providing a non-aqueous electrolyte solution for a secondary battery which may reduce an amount of metallic impurities in the battery by preventing the dissolution of transition metals and simultaneously suppressing a side reaction between the electrode and the electrolyte solution through the formation of a stable film on the surface of the positive electrode. Also, the present invention aims at providing a lithium secondary battery in which cycle characteristics during a high voltage operation are improved by including the non-aqueous electrolyte solution.

Non-Aqueous Electrolyte Solution for Lithium Secondary Battery

According to an embodiment, the present invention provides a non-aqueous electrolyte solution for a lithium secondary battery.

The non-aqueous electrolyte solution for a lithium secondary battery includes:

a lithium salt, an organic solvent containing a carbonate compound and a propionate compound, and an additive including 1,4-dicyano-2-butene and 1,3,5-cyclohexanetricarbonitrile (i.e. (1α,3α,5α)-1,3,5-cyclohexanetricarbonitrile), wherein a volume ratio of the carbonate compound to the propionate compound is 10:90 to 40:60, and wherein a weight ratio of the 1,4-dicyano-2-butene to the 1,3,5-cyclohexanetricarbonitrile is 1:1.5 to 1:3.7.

(1) Lithium Salt

First, a lithium salt will be described as follows.

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_4^-$, $PF_6^-$, $CF_3SO_3^-$, $CH_3CO_2^-$, $CF_3CO_2^-$, $AsF_6^-$, $SbF_6^-$, $CH_3SO_3$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (lithium bis(fluorosulfonyl)imide, LiFSI), $LiN(SO_2CF_2CF_3)_2$ (lithium bis(pentafluoroethanesulfonyl)imide, LiBETI), and $LiN(SO_2CF_3)_2$ (lithium bis(trifluoromethanesulfonyl)imide, LiTFSI), or a mixture of two or more thereof, and, in addition to the above-described lithium salt, any lithium salt commonly used in an electrolyte solution of a lithium secondary battery may be used without limitation. Specifically, the lithium sat may include $LiBF_6$.

The lithium salt may be appropriately changed in a normally usable range, but may be present in a concentration of 0.8 M to 3.0 M, for example, 1.0 M to 3.0 M in the electrolyte solution to obtain an optimum effect of forming a film for preventing corrosion of a surface of an electrode. In a case in which the concentration of the lithium salt satisfies the above range, viscosity of the non-aqueous electrolyte solution may be controlled so that optimum impregnability may be achieved, and an effect of improving capacity characteristics and cycle characteristics of the lithium secondary battery may be obtained by improving mobility of lithium ions.

(2) Organic Solvent

Also, an organic solvent will be described as follows.

The organic solvent may include a carbonate compound and a propionate compound.

Specifically, the carbonate compound may include at least one selected from the group consisting of a cyclic carbonate compound and a linear carbonate compound.

The cyclic carbonate compound is an organic solvent which may well dissociate the lithium salt in an electrolyte due to high permittivity as a highly viscous organic solvent, wherein specific examples thereof may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate compound may include at least one selected from the group consisting of ethylene carbonate and propylene carbonate which may improve output characteristics by increasing ionic conductivity.

Also, the linear carbonate compound is an organic solvent having low viscosity and low permittivity, wherein typical examples thereof may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and, among them, the linear carbonate compound may include dimethyl carbonate.

Furthermore, in the present invention, in order to improve disadvantages of the carbonate compound, a propionate compound having relatively higher stability during high-temperature and high voltage operation than the carbonate compound may be mixed.

The propionate compound may include at least one selected from the group consisting of methyl propionate, ethyl propionate (EP), propyl propionate, and butyl propionate, and may specifically include at least one selected from the group consisting of ethyl propionate and propyl propionate.

The carbonate compound and the propionate compound may be present in a volume ratio of 10:90 to 40:60, specifically 20:80 to 40:60, and preferably 30:70 in the non-aqueous electrolyte solution.

The volume ratio of the carbonate compound to the propionate compound may have a significant effect on improving both capacity and cycle characteristics at high temperature and room temperature during the preparation of the secondary battery. Thus, in a case in which the volume ratio of the carbonate compound to the propionate compound satisfies the above range, a synergistic effect due to the mixed use of the two organic solvents may be achieved. For example, in a case in which the carbonate compound and the propionate compound are present within the above range, high-temperature storage stability may be improved during storage at a high voltage of 4.45 V or more and a high temperature of 60° C. or more, and simultaneously, the cycle characteristics and the capacity characteristics may be sufficiently improved by securing high ionic conductivity of the electrolyte solution.

Since the carbonate compound is sensitive to the side reaction due to high reactivity at high voltage, gas generation is increased in a case in which an excessive amount of the carbonate compound is used as a non-aqueous solvent when used in a high-voltage battery, and thus, the cell swelling is increased and the high-temperature storage stability may be decreased. Thus, in the case that the volume ratio of the carbonate compound to the propionate compound is adjusted within the above range, electrolyte wetting may be improved by suppressing an increase in viscosity of the electrolyte, an oxidation reaction of the carbonate compound may be decreased to further improve cell stability at high voltage and swelling inhibition performance, and safety of the cell may be improved because ionic conductivity of lithium ions may be improved and a stable SEI passivation film may be formed as the propionate compound is added at a desired level.

(3) Additive

The non-aqueous electrolyte solution for a lithium secondary battery of the present invention may include two types of nitrile-based compounds as an additive.

Specifically, the two types of nitrile-based compounds may include 1,4-dicyano-2-butene represented by the following Formula 1 and 1,3,5-cyclohexanetricarbonitrile (i.e. (1α,3α,5α)-1,3,5-cyclohexanetricarbonitrile) represented by Formula 2.

[Formula 1]

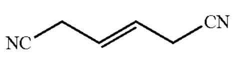

[Formula 2]

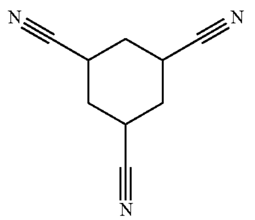

First, since the 1,4-dicyano-2-butene contains at least one polar nitrile group (—CN) having a high dipole moment at both ends, it may not only form a stable film by forming a strong bond with a positive electrode active material, but may also achieve an effect of suppressing metal ion dissolution due to a high binding force with the dissolved metal ions. Furthermore, since the 1,4-dicyano-2-butene further contains a double bond in the middle of its structure in comparison to succinonitrile or adiponitrile, a conventional nitrile-based additive, it may form a very stable ion conductive film by more easily forming a film in the form of an organic polymer through oxidative decomposition of the double bond and simultaneously forming a complex structure or ligand by strong binding with the metal ions on the surface of the positive electrode. As a result, a side reaction between the electrolyte and the positive electrode may be prevented, and gas generation may be suppressed. Furthermore, in addition to the metal ion adsorption effect as described above, since an unshared electron pair of nitrogen (N) of the nitrile group in the 1,4-dicyano-2-butene stabilizes the anion of the lithium salt to suppress generation of HF due to the decomposition of the lithium salt, the 1,4-dicyano-2-butene may further improve high-temperature storage characteristics of the secondary battery.

The 1,4-dicyano-2-butene may be present in an amount of 0.1 wt % to 2.5 wt % based on a total weight of the non-aqueous electrolyte solution for a lithium secondary battery.

In a case in which the 1,4-dicyano-2-butene is present in an amount within the above range, a stable film may be formed on the surface of the positive electrode to obtain a high effect of suppressing metal ion dissolution from the positive electrode, and a stable film may be formed on the surfaces of the negative electrode and the positive electrode to obtain a high effect of suppressing the gas generation due to the side reaction between the positive electrode and the electrolyte solution and the resulting cell swelling. Thus, in the case that the 1,4-dicyano-2-butene is present in an amount within the above range, the battery stability during high-temperature storage, the cell swelling, and the capacity characteristics may be further improved.

The 1,4-dicyano-2-butene may specifically be present in an amount of 0.5 wt % to 2 wt %, particularly 0.8 wt % to 1.7 wt %, and more particularly 0.8 wt % to 1.5 wt % based on a total weight of the non-aqueous electrolyte solution. In a case in which the amount of the 1,4-dicyano-2-butene is 0.5 wt % or more, a metallic foreign matter removal effect may be more stably maintained during battery operation time. In a case in which the amount of the compound represented by Formula 1 is 2.0 wt % or less, degradation of the capacity and cycle characteristics may be prevented because an increase in viscosity of the electrolyte solution caused by the surplus compound may be prevented, mobility of ions in the battery may be simultaneously improved, a cell swelling suppression effect may be significantly improved, and an increase in battery resistance may be effectively prevented by suppressing excessive film formation.

Also, since the 1,3,5-cyclohexanetricarbonitrile represented by Formula 2, which contains three or more nitrile groups having a high dipole moment, has very high binding affinity with ions of transition metals, such as cobalt (Co), manganese (Mn), or nickel (Ni), dissolved from the positive electrode during a repeated charge and discharge process of the battery or chemical dissolution reaction of the electrolyte solution, the dissolution of the metal ions may be effectively suppressed by forming a stable film on the surface of the positive electrode by binding with the metal ions. Particularly, since the 1,3,5-cyclohexanetricarbonitrile has a structure in which the nitrile groups form a large volume with each other, an ability to form a complex by binding with the dissolved metal ions is excellent, and, accordingly, precipitation or electrodeposition of the dissolved metal ions on the surface of the negative electrode may be prevented to improve thermal safety.

In the electrolyte solution of the present invention, a mixing ratio of the 1,3,5-cyclohexanetricarbonitrile to the 1,4-dicyano-2-butene may have an important effect on improving overall performance of the secondary battery, and the 1,4-dicyano-2-butene and the 1,3,5-cyclohexanetricarbonitrile may specifically be present in a weight ratio of 1:1.5 to 1:3.7 in the non-aqueous electrolyte solution.

In a case in which the 1,4-dicyano-2-butene and the 1,3,5-cyclohexanetricarbonitrile are present in amounts within the above range, since a stable film is formed during storage at a high voltage of 4.45 V or more and a high temperature of 60° C. or more, the metal dissolution from the positive electrode may be suppressed and the side reaction between the positive electrode and the electrolyte solution may be prevented, and thus, the gas generation and the cell swelling may be suppressed. In the case that the 1,4-dicyano-2-butene and the 1,3,5-cyclohexanetricarbonitrile are present in amounts within the above range, the transition metal dissolution suppression effect and the cycle characteristics and capacity characteristics of the secondary battery may be sufficiently improved while suppressing a decrease in capacity and an increase in resistance due to the side reaction as much as possible.

Specifically, the weight ratio of the 1,3,5-cyclohexanetricarbonitrile to the 1,4-dicyano-2-butene may be in a range of 1:1.5 to 1:3.3, for example, 1:2 to 1:3.0.

In a case in which the ratio of a weight of the 1,3,5-cyclohexanetricarbonitrile to a weight of the 1,4-dicyano-2-butene is 1.5 or more, since a stable film may be easily formed on the surface, the side reaction and the dissolution of the transition metals may be effectively suppressed, and thus, the battery capacity and cycle characteristics may be improved. In a case in which the ratio of the weight of the 1,3,5-cyclohexanetricarbonitrile to the weight of the 1,4-dicyano-2-butene is 3.3 or less, since a film having low resistance is formed on the positive electrode and the negative electrode, resistance may be reduced and lithium mobility may be improved, and thus, the cycle characteristics may be improved.

(4) Other Additives

The non-aqueous electrolyte solution for a lithium secondary battery of the present invention may further include other additional additives in addition to the two types of nitrile-based additives, if necessary, in order to prevent the occurrence of the collapse of the negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

Examples of the other additive may be at least one selected from the group consisting of a cyclic carbonate-based compound, a halogen-substituted carbonate-based compound, a sultone-based compound, a sulfate-based compound, a phosphate-based or phosphite-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate (VEC).

The halogen-substituted carbonate-based compound may include fluoroethylene carbonate (FEC).

The sultone-based compound, for example, may be at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may be ethylene sulfate (Esa), trimethylene sulfate (TMS), or methyl trimethylene sulfate (MTMS).

The phosphate-based or phosphite-based compound, for example, may be at least one compound selected from the group consisting of lithium difluoro bis(oxalato)phosphate, lithium difluorophosphate, tris(trimethylsilyl)phosphate, tris(trimethylsilyl)phosphite, tris(2,2,2-trifluoroethyl)phosphate, and tris(trifluoroethyl)phosphite.

The borate-based compound may include tetraphenylborate, and lithium oxalyldifluoroborate (LiODFB) or lithium bis(oxalato)borate ($LiB(C_2O_4)_2$, LiBOB) which may form a film on the surface of the negative electrode.

The nitrile-based compound may include a compound other than 1,4-dicyano-2-butene and 1,3,5-cyclohexanetricarbonitrile, for example, at least one compound selected from the group consisting of succinonitrile, pimelonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may be fluorobenzene, the amine-based compound may be triethanolamine or ethylenediamine, and the silane-based compound may be tetravinylsilane.

The lithium salt-based compound is a compound different from the lithium salt included in the non-aqueous electrolyte solution, wherein the lithium salt-based compound may include $LiPO_2F_2$ or $LiBF_4$.

Among these other additives, in order to form a more robust SEI on the surface of the negative electrode, the non-aqueous electrolyte solution may include other additives having an excellent effect of forming a film on the surface of the negative electrode, specifically at least one selected from the group consisting of vinylene carbonate, vinylethylene carbonate, fluoroethylene carbonate (FEC), and lithium oxalyldifluoroborate (LiODFB) together with the 1,4-dicyano-2-butene and the 1,3,5-cyclohexanetricarbonitrile.

Two or more compounds may be mixed and used as the other additives, and the other additives may be present in an amount of 0.01 wt % to 50 wt %, specifically 0.01 wt % to 10 wt %, and preferably 0.05 wt % to 5 wt % in the non-aqueous electrolyte solution. When the amount of the other additives is within the above range, it is desirable because remaining of the unreacted material of the other additives due to the excessive addition and occurrence of the excessive side reaction may be prevented while an effect of improving the cycle characteristics by the other additives is sufficiently achieved.

Lithium Secondary Battery

Also, in another embodiment of the present invention, there is provided a lithium secondary battery including the non-aqueous electrolyte solution for a lithium secondary battery of the present invention.

Specifically, the lithium secondary battery may include a positive electrode, a negative electrode, and the above-described non-aqueous electrolyte solution for a lithium secondary battery.

More specifically, the lithium secondary battery may include a positive electrode including a positive electrode active material, a negative electrode including a negative electrode active material, a separator disposed between the positive electrode and the negative electrode, and the above-described non-aqueous electrolyte solution for a lithium secondary battery.

After an electrode assembly, in which the positive electrode, the separator, and the negative electrode are sequentially stacked, is formed and accommodated in a battery case, the lithium secondary battery of the present invention may be prepared by injecting the non-aqueous electrolyte solution of the present invention.

The lithium secondary battery of the present invention may be prepared according to a conventional method known in the art and used, and a method of preparing the lithium secondary battery of the present invention is specifically the same as that described later.

(1) Positive Electrode

The positive electrode may be prepared by coating a positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, the positive electrode active material is a compound capable of reversibly intercalating and deintercalating lithium, wherein the positive electrode active material may include a lithium transition metal oxide including lithium and at least one metal selected from the group consisting of cobalt, manganese, nickel, or aluminum.

Specifically, the positive electrode active material may include lithium-cobalt-based oxide (e.g., $LiCoO_2$, etc.), lithium-manganese-based oxide (e.g., $LiMnO_2$, $LiMn_2O_4$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), and any one thereof or a compound of two or more thereof may be included.

Among these materials, in terms of the improvement of capacity characteristics and stability of the battery, the positive electrode active material may include at least one selected from the group consisting of lithium-cobalt oxide, lithium-manganese-based oxide, and lithium-nickel-manganese-cobalt-based oxide (for example, includes at least one selected from the group consisting of $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), may specifically include at least one selected from the group consisting of lithium-cobalt oxide and lithium-nickel-manganese-cobalt-based oxide, and may more specifically include at least one selected from the group consisting of lithium-cobalt oxide and lithium-nickel-manganese-cobalt-based oxide in which a nickel content is 60 atm % or more.

The lithium-nickel-manganese-cobalt-based oxide may include at least one selected from the group consisting of $Li(Ni_{0.6}Mn_{0.2}Co_{0.2})O_2$, $Li(Ni_{0.7}Mn_{0.15}Co_{0.15})O_2$, and $Li(Ni_{0.8}Mn_{0.1}Co_{0.1})O_2$.

When high nickel (Hi-Ni), in which a Ni content is greater than 0.55, is used as the lithium transition metal oxide, since sizes of a $Li^{+1}$ ion and a $Ni^{+2}$ ion are similar, a cation mixing phenomenon occurs in which positions of the $Li^{+1}$ ion and the $Ni^{+2}$ ion are exchanged in a layered structure of the positive electrode active material during a charge and discharge process. That is, a nickel transition metal having a d orbital in an environment, such as a high temperature, should have an octahedral structure during coordinate bonding according to a change in oxidation number of Ni included in the positive electrode active material, but deformation and collapse of a crystal structure of the positive electrode active material occur while a distorted octahedron is formed by a heterogenization reaction in which the oxidation number is changed or the order of energy levels is reversed by external energy supply. Furthermore, since another side reaction, in which a transition metal, particularly nickel metal is dissolved from the positive electrode active material, is caused by the side reaction between the positive electrode active material and the electrolyte solution during high-temperature storage, overall performance of the secondary battery is degraded due to the structural collapse of the positive electrode active material as well as the depletion of the electrolyte solution.

In the present invention, this problem may be improved by using the non-aqueous electrolyte solution containing an additive with a specific configuration and the positive electrode including a high nickel (Hi-Ni) transition metal oxide, as a positive electrode active material, together. That is, since a robust ion conductive film is formed on the surface of the positive electrode by the non-aqueous electrolyte solution of the present invention, the cation mixing phenomenon of the $Li^{+1}$ ion and the $Ni^{+2}$ ion is suppressed and the side reaction between the positive electrode and the electrolyte solution and the metal dissolution phenomenon are effectively suppressed, and thus, structural instability of the high-capacity electrode may be alleviated. Therefore, since a sufficient amount of the nickel transition metal for ensuring the capacity of the lithium secondary battery may be secured, energy density may be increased to improve the output characteristics.

The positive electrode active material may be present in an amount of 80 wt % to 99 wt %, for example, 90 wt % to 99 wt % based on a total weight of solid content in the positive electrode slurry. In a case in which the amount of the positive electrode active material is 80 wt % or less, since the energy density is reduced, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be a fluorine resin-based binder including polyvinylidene fluoride (PVDF) or polytetrafluoroethylene (PTFE); a rubber-based binder including a styrene-butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder such as polyvinyl alcohol; a polyolefin-based binder including polyethylene or polypropylene; a polyimide-based binder; a polyester-based binder; and a silane-based binder.

The conductive agent is a material providing conductivity without causing adverse chemical changes in the battery, wherein it may be added in an amount of 1 wt % to 20 wt % based on the total weight of the solid content in the positive electrode slurry.

As a typical example of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

Furthermore, the solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of the solid content in the positive electrode slurry including the positive electrode active material as well as optionally the binder and the conductive agent is in a range of 10 wt % to 60 wt %, for example, 20 wt % to 50 wt %.

(2) Negative Electrode

The negative electrode may be prepared by coating a negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \le 1$; $1 \le y \le 3$; $1 \le z \le 8$) may be used as the metal composite oxide.

The material, which may be doped and undoped with lithium, may include Si, $SiO_x$ ($0 < x \le 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubnium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be present in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be a fluorine resin-based binder including polyvinylidene fluoride (PVDF) or polytetrafluoroethylene (PTFE); a rubber-based binder including a styrene-butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder such as polyvinyl alcohol; a polyolefin-based binder including polyethylene or polypropylene; a polyimide-based binder; a polyester-based binder; and a silane-based binder.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 75 wt %, for example, 50 wt % to 65 wt %.

(3) Separator

A typical porous polymer film generally used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the lithium secondary battery of the present invention, and a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Preparation of Non-aqueous Electrolyte Solution for Lithium Secondary Battery

Example 1

After dissolving $LiPF_6$ in 95.5 g of a non-aqueous organic solvent, in which ethylene carbonate (EC), propylene carbonate (PC), ethyl propionate (EP), and propyl propionate (PP) were mixed in a volume ratio of 2:1:2.5:4.5, such that a concentration of the $LiPF_6$ was 1.2 M, a non-aqueous electrolyte solution for a lithium secondary battery was prepared by adding 1.0 g of 1,4-dicyano-2-butene (hereinafter, referred to as "DCB"), 1.5 g of 1,3,5-cyclohexanetricarbonitrile (hereinafter, referred to as "CHTN"), and 1.0 g of vinyl ethylene carbonate (VEC) and 1.0 g of fluoroethylene carbonate (FEC), as other additives (see Table 1 below).

Example 2

A non-aqueous electrolyte solution for a lithium secondary battery was prepared in the same manner as in Example 1 except that 1.0 g of DCB and 2.0 g of CHTN, as additives, and 1.0 g of VEC and 1.0 g of FEC, as other additives, were added to 95.0 g of the non-aqueous organic solvent (see Table 1 below).

Example 3

A non-aqueous electrolyte solution for a lithium secondary battery was prepared in the same manner as in Example 1 except that 1.0 g of DCB and 3.0 g of CHTN, as additives, and 1.0 g of VEC and 1.0 g of FEC, as other additives, were added to 94.0 g of the non-aqueous organic solvent (see Table 1 below).

Example 4

A non-aqueous electrolyte solution for a lithium secondary battery was prepared in the same manner as in Example 1 except that 1.0 g of DCB and 3.5 g of CHTN, as additives, and 1.0 g of VEC and 1.0 g of FEC, as other additives, were added to 93.5 g of the non-aqueous organic solvent (see Table 1 below).

Comparative Example 1

A non-aqueous electrolyte solution for a lithium secondary battery was prepared in the same manner as in Example 1 except that 1.0 g of DCB, as an additive, and 1.0 g of VEC, 1.0 g of FEC, and 1.5 g of triscyanoethylamine, as other additives, were added to 95.5 g of the non-aqueous organic solvent (see Table 1 below).

Comparative Example 2

A non-aqueous electrolyte solution for a lithium secondary battery was prepared in the same manner as in Example 1 except that 1.0 g of DCB, as an additive, and 1.0 g of VEC, 1.0 g of FEC, and 1.5 g of triscyanoethoxypropane, as other additives, were added to 95.5 g of the non-aqueous organic solvent (see Table 1 below).

Comparative Example 3

A non-aqueous electrolyte solution for a lithium secondary battery was prepared in the same manner as in Example 1 except that 1.0 g of DCB, as an additive, and 1.0 g of VEC, 1.0 g of FEC, and 1.0 g of 1,3,6-hexanetricarbonitrile (HTCN), as other additives, were added to 96.0 g of the non-aqueous organic solvent (see Table 1 below).

Comparative Example 4

A non-aqueous electrolyte solution for a lithium secondary battery was prepared in the same manner as in Example 1 except that 1.5 g of CHTN, as an additive, and 1.0 g of VEC, 1.0 g of FEC, and 1.0 g of SN, as other additives, were added to 95.5 g of the non-aqueous organic solvent (see Table 1 below).

Comparative Example 5

A non-aqueous electrolyte solution for a lithium secondary battery was prepared in the same manner as in Example 1 except that 1.0 g of VEC, 1.0 g of FEC, 1.5 g of SN, and 1.0 g of 1,3,6-hexanetricarbonitrile (HTCN), as other additives, were added to 95.5 g of the non-aqueous organic solvent (see Table 1 below).

Comparative Example 6

A non-aqueous electrolyte solution for a lithium secondary battery was prepared in the same manner as in Example 1 except that 1.0 g of CHTN, as an additive, and 1.0 g of VEC, 1.0 g of FEC, and 1.0 g of SN, as other additives, were added to 96.0 g of the non-aqueous organic solvent (see Table 1 below).

Comparative Example 7

A non-aqueous electrolyte solution for a lithium secondary battery was prepared in the same manner as in Example 1 except that 3.0 g of CHTN, as an additive, and 1.0 g of VEC, 1.0 g of FEC, and 2.0 g of pimelonitrile (PN), as other additives, were added to 93.0 g of the non-aqueous organic solvent (see Table 1 below).

Comparative Example 8

A non-aqueous electrolyte solution for a lithium secondary battery was prepared in the same manner as in Example 1 except that 1.0 g of DCB and 1.4 g of CHTN, as additives, and 1.0 g of VEC and 1.0 g of FEC, as other additives, were added to 95.6 g of the non-aqueous organic solvent (see Table 1 below).

Comparative Example 9

A non-aqueous electrolyte solution for a lithium secondary battery was prepared in the same manner as in Example 1 except that 1.0 g of DCB and 4.0 g of CHTN, as additives, and 1.0 g of VEC and 1.0 g of FEC, as other additives, were added to 93.0 g of the non-aqueous organic solvent (see Table 1 below).

Comparative Example 10

A non-aqueous electrolyte solution for a lithium secondary battery was prepared in the same manner as in Example 1 except that 1.0 g of DCB and 1.0 g of CHTN, as additives, and 1.0 g of VEC and 1.0 g of FEC, as other additives, were added to 96.0 g of the non-aqueous organic solvent (see Table 1 below).

Comparative Example 11

A non-aqueous electrolyte solution for a lithium secondary battery was prepared in the same manner as in Example 1 except that 1.0 g of DCB and 1.0 g of CHTN, as additives, and 1.0 g of VEC, 1.0 g of FEC, and 1.0 g of SN, as other additives, were added to 95.0 g of the non-aqueous organic solvent (see Table 1 below).

TABLE 1

| | Non-aqueous organic solvent | Additives | | Other additives | | | |
|---|---|---|---|---|---|---|---|
| | | DCB | CHTN | Additives other than nitrile-based additives | | Nitrile-based additives | |
| Examples | amount (g) | amount (g) | amount (g) | Type | Amount (g) | Type | Amount (g) |
| Example 1 | 95.5 | 1.0 | 1.5 | VEC/FEC | 1.0/1.0 | — | — |
| Example 2 | 95 | 1.0 | 2.0 | VEC/FEC | 1.0/1.0 | — | — |
| Example 3 | 94 | 1.0 | 3.0 | VEC/FEC | 1.0/1.0 | — | — |
| Example 4 | 93.5 | 1.0 | 3.5 | VEC/FEC | 1.0/1.0 | — | — |
| Comparative Example 1 | 95.5 | 1.0 | — | VEC/FEC | 1.0/1.0 | Triscyano-ethyl-amine | 1.5 |
| Comparative Example 2 | 95.5 | 1.0 | — | VEC/FEC | 1.0/1.0 | Triscyano-ethoxy-propane | 1.5 |
| Comparative Example 3 | 96 | 1.0 | — | VEC/FEC | 1.0/1.0 | HTCN | 1.0 |
| Comparative Example 4 | 95.5 | — | 1.5 | VEC/FEC | 1.0/1.0 | SN | 1.0 |
| Comparative Example 5 | 95.5 | — | — | VEC/FEC | 1.0/1.0 | HTCN<br>SN | 1.0<br>1.5 |
| Comparative Example 6 | 96 | — | 1.0 | VEC/FEC | 1.0/1.0 | SN | 1.0 |
| Comparative Example 7 | 93 | — | 3.0 | VEC/FEC | 1.0/1.0 | PN | 2.0 |
| Comparative Example 8 | 95.6 | 1.0 | 1.4 | VEC/FEC | 1.0/1.0 | — | — |
| Comparative Example 9 | 93.0 | 1.0 | 4.0 | VEC/FEC | 1.0/1.0 | — | — |
| Comparative Example 10 | 96 | 1.0 | 1.0 | VEC/FEC | 1.0/1.0 | — | — |
| Comparative Example 11 | 95 | 1.0 | 1.0 | VEC/FEC | 1.0/1.0 | SN | 1.0 |

In Table 1, the abbreviation of each compound has the following meaning.

DCB: 1,4-dicyano-2-butene

CHTN: 1,3,5-cyclohexanetricarbonitrile

HTCN: 1,3,6-hexanetricarbonitrile

SN: succinonitrile

PN: pimelonitrile

FEC: fluoroethylene carbonate

VEC: vinyl ethylene carbonate

II. Lithium Secondary Battery Preparation

Example 5

A positive electrode active material ($LiCoO_2$), a conductive agent (carbon black), and a binder (polyvinylidene fluoride) were added to N-methyl-2-pyrrolidone (NMP) in a weight ratio of 97.5:1:1.5 to prepare a positive electrode slurry (solid content: 50 wt %). A 12 μm thick aluminum (Al) thin film, as a positive electrode collector, was coated with the positive electrode slurry, dried, and then roll-pressed to prepare a positive electrode.

A negative electrode active material (artificial graphite), a binder (SBR-CMC), and a conductive agent (carbon black) were added to water in a weight ratio of 95:3.5:1.5 to prepare a negative electrode slurry (solid content: 60 wt %). A 6 μm thick copper (Cu) thin film, as a negative electrode collector, was coated with the negative electrode slurry, dried, and then roll-pressed to prepare a negative electrode.

An electrode assembly was prepared by sequentially stacking the positive electrode, a polyolefin-based porous separator coated with inorganic particles ($Al_2O_3$), and the negative electrode.

The electrode assembly was accommodated in a pouch-type battery case, and the non-aqueous electrolyte solution of Example 1 was injected thereinto to prepare a pouch-type lithium secondary battery with an operating voltage of 4.45 V or higher.

Example 6

A pouch-type lithium secondary battery was prepared in the same manner as in Example 5 except that the non-aqueous electrolyte solution of Example 2, instead of the non-aqueous electrolyte solution of Example 1, was injected.

Example 7

A pouch-type lithium secondary battery was prepared in the same manner as in Example 5 except that the non-aqueous electrolyte solution of Example 3, instead of the non-aqueous electrolyte solution of Example 1, was injected.

Example 8

A pouch-type lithium secondary battery was prepared in the same manner as in Example 5 except that the non-aqueous electrolyte solution of Example 4, instead of the non-aqueous electrolyte solution of Example 1, was injected.

Example 9

A pouch-type lithium secondary battery was prepared in the same manner as in Example 5 except that $Li(Ni_{0.8}Mn_{0.1}Co_{0.1})O_2$ was used as a positive electrode active material.

Example 10

A pouch-type lithium secondary battery was prepared in the same manner as in Example 6 except that $Li(Ni_{0.8}Mn_{0.1}Co_{0.1})O_2$ was used as a positive electrode active material.

Example 11

A pouch-type lithium secondary battery was prepared in the same manner as in Example 8 except that $Li(Ni_{0.8}Mn_{0.1}Co_{0.1})O_2$ was used as a positive electrode active material.

Comparative Example 12

A pouch-type lithium secondary battery was prepared in the same manner as in Example 5 except that the non-aqueous electrolyte solution of Comparative Example 1, instead of the non-aqueous electrolyte solution of Example 1, was injected.

Comparative Example 13

A pouch-type lithium secondary battery was prepared in the same manner as in Example 5 except that the non-aqueous electrolyte solution of Comparative Example 2, instead of the non-aqueous electrolyte solution of Example 1, was injected.

Comparative Example 14

A pouch-type lithium secondary battery was prepared in the same manner as in Example 5 except that the non-aqueous electrolyte solution of Comparative Example 3, instead of the non-aqueous electrolyte solution of Example 1, was injected.

Comparative Example 15

A pouch-type lithium secondary battery was prepared in the same manner as in Example 5 except that the non-aqueous electrolyte solution of Comparative Example 4, instead of the non-aqueous electrolyte solution of Example 1, was injected.

Comparative Example 16

A pouch-type lithium secondary battery was prepared in the same manner as in Example 5 except that the non-aqueous electrolyte solution of Comparative Example 5, instead of the non-aqueous electrolyte solution of Example 1, was injected.

Comparative Example 17

A pouch-type lithium secondary battery was prepared in the same manner as in Example 5 except that the non-aqueous electrolyte solution of Comparative Example 6, instead of the non-aqueous electrolyte solution of Example 1, was injected.

Comparative Example 18

A pouch-type lithium secondary battery was prepared in the same manner as in Example 5 except that the non-aqueous electrolyte solution of Comparative Example 7, instead of the non-aqueous electrolyte solution of Example 1, was injected.

Comparative Example 19

A pouch-type lithium secondary battery was prepared in the same manner as in Example 5 except that the non-aqueous electrolyte solution of Comparative Example 8, instead of the non-aqueous electrolyte solution of Example 1, was injected.

Comparative Example 20

A pouch-type lithium secondary battery was prepared in the same manner as in Example 5 except that the non-aqueous electrolyte solution of Comparative Example 9, instead of the non-aqueous electrolyte solution of Example 1, was injected.

Comparative Example 21

A pouch-type lithium secondary battery was prepared in the same manner as in Example 5 except that the non-aqueous electrolyte solution of Comparative Example 10, instead of the non-aqueous electrolyte solution of Example 1, was injected.

Comparative Example 22

A pouch-type lithium secondary battery was prepared in the same manner as in Example 5 except that the non-aqueous electrolyte solution of Comparative Example 11, instead of the non-aqueous electrolyte solution of Example 1, was injected.

Comparative Example 23

A pouch-type lithium secondary battery was prepared in the same manner as in Example 9 except that the non-aqueous electrolyte solution of Comparative Example 3, instead of the non-aqueous electrolyte solution of Example 1, was injected.

Comparative Example 24

A pouch-type lithium secondary battery was prepared in the same manner as in Example 9 except that the non-aqueous electrolyte solution of Comparative Example 8, instead of the non-aqueous electrolyte solution of Example 1, was injected.

Comparative Example 25

A pouch-type lithium secondary battery was prepared in the same manner as in Example 9 except that the non-aqueous electrolyte solution of Comparative Example 9, instead of the non-aqueous electrolyte solution of Example 1, was injected.

Experimental Examples

Experimental Example 1. Evaluation of Initial Discharge Capacity (1)

After the pouch-type secondary batteries prepared in Examples 5 to 8 and the pouch-type secondary batteries prepared in Comparative Examples 12 to 20 and 22 were placed in a dry room and respectively subjected to formation by being charged at 0.2 C rate (21.2 mA) to a state of charge (SOC) of ⅙ (17.6 mAh) at room temperature (25° C.), a degassing process was performed.

Then, after each secondary battery was discharged at 0.2 C, then charged at 0.7 C rate under a 0.2 C constant current/constant voltage condition, and discharged at 0.2 C rate, initial discharge capacity was measured using PNE-0506 charge/discharge equipment (manufacturer: PNE SOLUTION Co., Ltd.). The results thereof are presented in Table 2 below.

TABLE 2

| Examples | Non-aqueous electrolyte solution | Positive electrode type | Initial discharge capacity (mAh) |
|---|---|---|---|
| Example 5 | Example 1 | LCO | 105.8 |
| Example 6 | Example 2 | LCO | 103.7 |
| Example 7 | Example 3 | LCO | 101.3 |
| Example 8 | Example 4 | LCO | 99.8 |
| Comparative Example 12 | Comparative Example 1 | LCO | 80.7 |
| Comparative Example 13 | Comparative Example 2 | LCO | 81.6 |
| Comparative Example 14 | Comparative Example 3 | LCO | 77.8 |
| Comparative Example 15 | Comparative Example 4 | LCO | 77.6 |
| Comparative Example 16 | Comparative Example 5 | LCO | 73.5 |
| Comparative Example 17 | Comparative Example 6 | LCO | 72.6 |
| Comparative Example 18 | Comparative Example 7 | LCO | 77.8 |
| Comparative Example 19 | Comparative Example 8 | LCO | 75.7 |
| Comparative Example 20 | Comparative Example 9 | LCO | 73.6 |
| Comparative Example 22 | Comparative Example 11 | LCO | 97.0 |

Referring to Table 2, with respect to the lithium secondary batteries of Examples 5 to 8, it may be understood that initial discharge capacities were improved in comparison to those of the lithium secondary batteries of Comparative Examples 12 to 20 and 22. Particularly, it may be understood that the initial discharge capacity of the lithium secondary battery of Comparative Example 20, which included the non-aqueous electrolyte solution containing a rather large amount of 1,3,5-cyclohexanetricarbonitrile, was relatively lower than those of the secondary batteries of Examples 5 to 8 due to an increase in film resistance in the battery. Also, with respect to the secondary batteries of Comparative Examples 19 and 22 containing a small amount of 1,3,5-cyclohexane-tricarbonitrile, since film formation was not sufficient, metal ion dissolution occurred on the surface of the electrode, and thus, it may be understood that the initial discharge capacities were relatively decreased in comparison to those of the secondary batteries of Examples 5 to 8.

Experimental Example 2. Evaluation of Capacity Retention (%) after Charge and Discharge at Room Temperature (1)

The pouch-type secondary batteries prepared in Examples 5 to 8 and the pouch-type secondary batteries prepared in Comparative Examples 12 to 17 and 19 to 21 were charged at 1.0 C rate (106 mA) at room temperature (25° C.) and discharged at 1.0 C rate (106 mA). After the above charging and discharging were set as one cycle and 200 cycles were preformed, capacity retention (%) was measured using PNE-0506 charge/discharge equipment (manufacturer: PNE SOLUTION Co., Ltd., 5 V, 6 A), and the results thereof are presented in Table 3 below. The capacity retention (%) was calculated according to [Equation 1] below.

Capacity retention (%)=(discharge capacity after 200 cycles/discharge capacity after one cycle)×100 [Equation 1]

TABLE 3

| Examples | Non-aqueous electrolyte solution | Positive electrode type | Capacity retention after cycles at 25° C. (%) |
|---|---|---|---|
| Example 5 | Example 1 | LCO | 82.4 |
| Example 6 | Example 2 | LCO | 80.5 |
| Example 7 | Example 3 | LCO | 79.3 |
| Example 8 | Example 4 | LCO | 79.1 |
| Comparative Example 12 | Comparative Example 1 | LCO | 75.5 |
| Comparative Example 13 | Comparative Example 2 | LCO | 77.1 |
| Comparative Example 14 | Comparative Example 3 | LCO | 78.5 |
| Comparative Example 15 | Comparative Example 4 | LCO | 73.3 |
| Comparative Example 16 | Comparative Example 5 | LCO | 72.0 |
| Comparative Example 17 | Comparative Example 6 | LCO | 70.7 |
| Comparative Example 19 | Comparative Example 8 | LCO | 65.3 |
| Comparative Example 20 | Comparative Example 9 | LCO | 64.8 |
| Comparative Example 21 | Comparative Example 10 | LCO | 78.2 |

Referring to Table 3, with respect to the lithium secondary batteries of Examples 5 to 8 which included the non-aqueous electrolyte solution containing the additive of the present invention, it may be understood that capacity retentions after charge and discharge at room temperature were improved in comparison to those of the lithium secondary batteries of Comparative Examples 12 to 17 and 19 to 21. Particularly, it may be understood that the capacity retention (%) of the lithium secondary battery of Comparative Example 20, which included the non-aqueous electrolyte solution containing a rather large amount of 1,3,5-cyclohexanetricarbonitrile, was relatively lower than those of the lithium secondary batteries of Examples 5 to 8 due to an increase in film resistance in the battery. Also, with respect to the secondary battery of Comparative Example 21 containing a relatively small amount of 1,3,5-cyclohexanetricarbonitrile, since film formation was not sufficient, metal ion dissolution occurred on the surface of the electrode, and thus, it seemed that the capacity retention was lower than those of the secondary batteries of Examples 5 to 8.

Experimental Example 3. Evaluation of Capacity Retention (%) after Charge and Discharge at High Temperature (1)

The pouch-type secondary batteries prepared in Examples 5 to 7 and the pouch-type secondary batteries prepared in Comparative Examples 12, 13, 15 to 17, and 19 to 22 were charged at 1.0 C rate (106 mA) at a high temperature (45° C.) and discharged at 1.0 C rate (106 mA). After the above charging and discharging were set as one cycle and 200 cycles were preformed, capacity retention (%) was measured using PNE-0506 charge/discharge equipment (manufacturer: PNE SOLUTION Co., Ltd., 5 V, 6 A), and the results thereof are presented in Table 4 below. The capacity retention (%) was calculated according to Equation 1.

TABLE 4

| Examples | Non-aqueous electrolyte solution | Positive electrode type | Capacity retention after cycles at 45° C. (%) |
|---|---|---|---|
| Example 5 | Example 1 | LCO | 80.5 |
| Example 6 | Example 2 | LCO | 78.1 |
| Example 7 | Example 3 | LCO | 77.5 |
| Comparative Example 12 | Comparative Example 1 | LCO | 73.8 |
| Comparative Example 13 | Comparative Example 2 | LCO | 73.0 |
| Comparative Example 15 | Comparative Example 4 | LCO | 61.4 |
| Comparative Example 16 | Comparative Example 5 | LCO | 55.6 |
| Comparative Example 17 | Comparative Example 6 | LCO | 59.1 |
| Comparative Example 19 | Comparative Example 8 | LCO | 55.3 |
| Comparative Example 20 | Comparative Example 9 | LCO | 57.5 |
| Comparative Example 21 | Comparative Example 10 | LCO | 76.5 |
| Comparative Example 22 | Comparative Example 11 | LCO | 75.5 |

Referring to Table 4, with respect to the lithium secondary batteries of Examples 5 to 7 which included the non-aqueous electrolyte solution containing the additive of the present invention, it may be understood that high-temperature cycle capacity retentions were improved in comparison to those of the lithium secondary batteries of Comparative Examples 12, 13, 15 to 17, and 19 to 22.

Experimental Example 4. Characteristic Evaluation after High-Temperature Storage (1)

After the pouch-type secondary batteries prepared in Examples 5 to 7 and the pouch-type secondary batteries prepared in Comparative Examples 13, 14, and 16 to 22 were subjected to formation by being charged at 0.2 C rate (21.2 mA) to a SOC of 1/6 (17.6 mAh) at room temperature (25° C.) in a dry room, each secondary battery was fully discharged at 0.2 C rate and then again charged/discharged at 0.2 C. Thereafter, each secondary battery was fully charged at 0.2 C rate and stored at a high temperature of 85° C. for 8 hours.

Then, after charge and discharge were performed by charging each secondary battery at 1.0 C rate (106 mA) and discharging each secondary battery at 1.0 C rate (106 mA), discharge capacity was measured using PNE-0506 charge/discharge equipment (manufacturer: PNE SOLUTION Co., Ltd., 5 V, 6 A), and the results thereof are presented in Table 5 below.

TABLE 5

| Examples | Non-aqueous electrolyte solution | Positive electrode type | Discharge capacity after high-temperature storage at 85° C. (%) |
|---|---|---|---|
| Example 5 | Example 1 | LCO | 91.1 |
| Example 6 | Example 2 | LCO | 89.5 |
| Example 7 | Example 3 | LCO | 85.3 |
| Comparative Example 13 | Comparative Example 2 | LCO | 78.3 |
| Comparative Example 14 | Comparative Example 3 | LCO | 83.5 |
| Comparative Example 16 | Comparative Example 5 | LCO | 75.6 |
| Comparative Example 17 | Comparative Example 6 | LCO | 70.5 |
| Comparative Example 18 | Comparative Example 7 | LCO | 71.0 |
| Comparative Example 19 | Comparative Example 8 | LCO | 69.4 |
| Comparative Example 20 | Comparative Example 9 | LCO | 67.3 |
| Comparative Example 21 | Comparative Example 10 | LCO | 82.9 |
| Comparative Example 22 | Comparative Example 11 | LCO | 82.1 |

Referring to Table 5, with respect to the lithium secondary batteries of Examples 5 to 7 which included the non-aqueous electrolyte solution of the present invention, it may be understood that discharge capacities after high-temperature storage were improved in comparison to those of the lithium secondary batteries of Comparative Examples 13, 14, and 16 to 22.

Experimental Example 5. Evaluation of Initial Discharge Capacity (2)

After the pouch-type secondary batteries prepared in Examples 9 to 11 and the pouch-type secondary batteries prepared in Comparative Examples 23 to 25 were respectively subjected to formation by being charged at 0.2 C rate (21.2 mA) to a SOC of 1/6 (17.6 mAh) at room temperature (25° C.) in a dry room, a degassing process was performed.

Then, after each secondary battery was discharged at 0.2 C, then charged at 0.7 C rate under a 0.2 C constant current/constant voltage condition, and discharged at 0.2 C rate, initial discharge capacity was measured using PNE-0506 charge/discharge equipment (manufacturer: PNE SOLUTION Co., Ltd.). The results thereof are presented in Table 6 below.

Experimental Example 6. Evaluation of Capacity Retention (%) after Charge and Discharge at Room Temperature (2)

The pouch-type secondary batteries prepared in Examples 9 to 11 and the pouch-type secondary batteries prepared in Comparative Examples 23 to 25 were charged at 1.0 C rate (106 mA) at room temperature (25° C.) and discharged at 1.0 C rate (106 mA). After the above charging and discharging were set as one cycle and 200 cycles were preformed, capacity retention (%) was measured using PNE-0506 charge/discharge equipment (manufacturer: PNE SOLUTION Co., Ltd., 5 V, 6 A), and the results thereof are presented in Table 6 below. The capacity retention (%) was calculated according to [Equation 1].

Experimental Example 7. Evaluation of Capacity Retention (%) after Charge and Discharge at High Temperature (2)

The pouch-type secondary batteries prepared in Examples 9 to 11 and the pouch-type secondary batteries prepared in Comparative Examples 23 to 25 were charged at 1.0 C rate (106 mA) at a high temperature (45° C.) and discharged at 1.0 C rate (106 mA). After the above charging and discharging were set as one cycle and 200 cycles were preformed, capacity retention (%) was measured using PNE-0506 charge/discharge equipment (manufacturer: PNE SOLUTION Co., Ltd., 5 V, 6 A), and the results thereof are presented in Table 6 below. The capacity retention (%) was calculated according to [Equation 1].

Experimental Example 8. Characteristic Evaluation after High-temperature Storage (2)

After the pouch-type secondary batteries prepared in Examples 9 to 11 and the pouch-type secondary batteries prepared in Comparative Examples 23 to 25 were subjected to formation by being charged at 0.2 C rate (21.2 mA) to a SOC of 1/6 (17.6 mAh) at room temperature (25° C.), each secondary battery was fully discharged at 0.2 C rate and then again charged/discharged at 0.2 C. Thereafter, each secondary battery was fully charged at 0.2 C rate and stored at a high temperature (85° C.) for 8 hours.

Then, after charge and discharge were performed by charging each secondary battery at 1.0 C rate (106 mA) and discharging each secondary battery at 1.0 C rate (106 mA), discharge capacity was measured using PNE-0506 charge/discharge equipment (manufacturer: PNE SOLUTION Co., Ltd., 5 V, 6 A), and the results thereof are presented in Table 6 below.

TABLE 6

| Examples | Positive electrode type | Non-aqueous electrolyte solution | Initial capacity (mAh) | Capacity retention after cycles at 25° C. (%) | Capacity retention after cycles at 45° C. (%) | Discharge capacity after high-temperature storage at 85° C. (%) |
|---|---|---|---|---|---|---|
| Example 9 | Li $(Ni_{0.8}Mn_{0.1}$ | Example 1 | 106.0 | 82.8 | 81.1 | 91.9 |
| Example 10 | $Co_{0.1})\ O_2$ | Example 2 | 104.3 | 80.4 | 79.9 | 90.2 |
| Example 11 | | Example 4 | 102.2 | 78.6 | 77.2 | 88.5 |
| Comparative Example 23 | | Comparative Example 1 | 72.1 | 75.6 | 74.3 | 80.6 |
| Comparative Example 24 | | Comparative Example 8 | 70.3 | 74.3 | 71.1 | 76.8 |
| Comparative Example 25 | | Comparative Example 9 | 68.5 | 73.8 | 72.4 | 73.8 |

Referring to the results of the initial discharge capacity evaluation in Table 6, with respect to the lithium secondary batteries of Examples 9 to 11, it may be understood that initial discharge capacities, capacity retentions (%) after room-temperature and high-temperature cycles, and discharge capacities after high-temperature storage were all improved in comparison to those of the lithium secondary batteries of Comparative Examples 23 to 25.

Experimental Example 9. Resistance Evaluation

After each of the lithium secondary batteries prepared in Example 5 and Comparative Example 21 was charged at 0.5 C rate to a SOC of 50% at room temperature (25° C.), a change in impedance of the battery according to the amount of the additive was measured by applying alternating current (AC) signals of different frequencies to the cell through an electrochemical impedance spectroscopy (EIS) measurement method. The results thereof are presented in FIG. 1 below.

Referring to FIG. 1, with respect to the secondary battery of Example 5 including the non-aqueous electrolyte solution of Example 1 in which 1,4-dicyano-2-butene and 1,3,5-cyclohexanetricarbonitrile were included in a ratio of 1:1.5, it may be confirmed that AC resistance had the smallest value and charge and discharge performance was increased. In contrast, with respect to the secondary battery of Comparative Example 21 including the non-aqueous electrolyte solution in which the ratio of the 1,4-dicyano-2-butene to the 1,3,5-cyclohexanetricarbonitrile was 1:1, it may be confirmed that resistance was higher than that of the secondary battery of Example 5.

Referring to these results, it may be understood that film resistance on the surface of the electrode was increased when the amount of the 1,4-dicyano-2-butene was somewhat higher than that of the 1,3,5-cyclohexanetricarbonitrile. Thus, it may be understood that it is preferable for the ratio of the weight of the 1,3,5-cyclohexanetricarbonitrile to the weight of 1,4-dicyano-2-butene to be 1.5 or more.

The invention claimed is:

1. A non-aqueous electrolyte solution for a lithium secondary battery, the non-aqueous electrolyte solution comprising:

a lithium salt;

an organic solvent containing a carbonate compound and a propionate compound; and an additive comprising 1,4-dicyano-2-butene and 1,3,5-cyclohexanetricarbonitrile, wherein a volume ratio of the carbonate compound to the propionate compound is 10:90 to 40:60, wherein the carbonate compound is at least one selected from ethylene carbonate or propylene carbonate, wherein the propionate compound is at least one selected from methyl propionate, ethyl propionate, propyl propionate, or butyl propionate, wherein a weight ratio of the 1,4-dicyano-2-butene to the 1,3,5-cyclohexanetricarbonitrile is 1:1.5 to 1:3.5, and wherein the 1,4-dicyano-2-butene is present in an amount of 0.1 wt % to 2.5 wt % based on a total weight of the non-aqueous electrolyte solution.

2. The non-aqueous electrolyte solution for a lithium secondary battery of claim 1, wherein the volume ratio of the carbonate compound to the propionate compound is 20:80 to 40:60.

3. The non-aqueous electrolyte solution for a lithium secondary battery of claim 1, wherein the weight ratio of the 1,4-dicyano-2-butene to the 1,3,5-cyclohexanetricarbonitrile is 1:1.5 to 1:3.3.

4. A lithium secondary battery, comprising:

a positive electrode including a positive electrode active material;

a negative electrode including a negative electrode active material;

a separator disposed between the negative electrode and the positive electrode; and the non-aqueous electrolyte solution of claim 1.

5. The lithium secondary battery of claim 4, wherein the positive electrode active material comprises at least one of lithium-cobalt oxide, lithium-manganese-based oxide, or lithium-nickel-manganese-cobalt-based oxide.

6. The lithium secondary battery of claim 4, wherein the positive electrode active material comprises at least one of lithium-cobalt oxide or lithium-nickel-manganese-cobalt-based oxide.

7. The lithium secondary battery of claim 6, wherein the lithium-nickel-manganese-cobalt-based oxide comprises at least one of $Li(Ni_{0.6}Mn_{0.2}Co_{0.2})O_2$, $Li(Ni_{0.7}Mn_{0.15}Co_{0.15})O_2$, or $Li(Ni_{0.8}Mn_{0.1}Co_{0.1})O_2$.

* * * * *